(12) United States Patent
Shiue et al.

(10) Patent No.: US 10,787,078 B2
(45) Date of Patent: Sep. 29, 2020

(54) TOUCH KNOB AND DEVICE USING SAME (71) Applicants: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

(72) Inventors: Nai-Hau Shiue, Zhunan (TW); Yen-Heng Huang, Zhunan (TW); Yen-Chang Yao, Zhunan (TW); Li-Chun Hsu, Zhunan (TW); Chih-Chiang Lin, Zhunan (TW); Ya-Ting Chang, Zhunan (TW); Yen-Hsun Chen, Zhunan (TW)

(73) Assignees: Interface Technology (ChengDu) Co., Ltd., Chengdu (CN); INTERFACE OPTOELECTRONICS (SHENZHEN) CO., LTD., Shenzhen (CN); GENERAL INTERFACE SOLUTION LIMITED, Zhunan (TW)

( * ) Notice: Subject to any disclaimer, the term of this patent is extended or adjusted under 35 U.S.C. 154(b) by 16 days.

(21) Appl. No.: 16/280,240

(22) Filed: Feb. 20, 2019

(65) Prior Publication Data
US 2020/0079217 A1    Mar. 12, 2020

(30) Foreign Application Priority Data

Sep. 12, 2018 (CN) .......................... 2018 1 1061087

(51) Int. Cl.
*B60K 37/06* (2006.01)
*G06F 3/0362* (2013.01)
*G06F 3/044* (2006.01)

(52) U.S. Cl.
CPC ............ *B60K 37/06* (2013.01); *G06F 3/0362* (2013.01); *G06F 3/044* (2013.01); *B60K 2370/126* (2019.05); *B60K 2370/143* (2019.05); *B60K 2370/145* (2019.05)

(58) Field of Classification Search
None
See application file for complete search history.

(56) References Cited

U.S. PATENT DOCUMENTS 5,572,239 A * 11/1996 Jaeger ................. G02F 1/13306
                                                          345/172
5,841,428 A * 11/1998 Jaeger ................. G02F 1/13306
                                                          345/184

(Continued)

*Primary Examiner* — Dorothy Harris
(74) *Attorney, Agent, or Firm* — ScienBiziP, P.C.

(57) ABSTRACT

A touch knob which can transmit user touches above to a touch-sensitive surface below includes a base, a rotating shaft, and a rotating cap. The rotating cap defines a receiving groove facing the base, and the rotating shaft extends into the receiving groove and is connected to the rotating cap. The rotating cap is configured to rotate to transmit user touches in a bounded circular area, at least one conductive touch head is located on the rotating cap and in the receiving groove, and moves as the rotating cap moves. The disclosure avoids the need to cut or form any opening in the cover of the touch-sensitive surface or panel for buttons to be installed. A device using the above touch knob is also provided.

17 Claims, 6 Drawing Sheets

(56) References Cited

U.S. PATENT DOCUMENTS

| | | | | |
|---|---|---|---|---|
| 6,225,580 B1* | 5/2001 | Lemire | ............... | H01H 1/16 |
| | | | | 200/11 D |
| 6,225,980 B1* | 5/2001 | Weiss | ............... | G06F 3/0362 |
| | | | | 345/156 |
| 6,236,002 B1* | 5/2001 | Chou | ............... | H01H 19/585 |
| | | | | 200/1 R |
| 8,698,747 B1* | 4/2014 | Stelung | ............... | G06F 3/038 |
| | | | | 345/161 |
| 2008/0238879 A1* | 10/2008 | Jaeger | ............... | G06F 3/03545 |
| | | | | 345/173 |
| 2008/0289439 A1* | 11/2008 | Miura | ............... | B60K 37/06 |
| | | | | 74/10.41 |
| 2014/0260776 A1* | 9/2014 | Burleson | ............... | G05G 1/10 |
| | | | | 74/553 |
| 2018/0024649 A1* | 1/2018 | Uno | ............... | G06F 3/041 |
| | | | | 345/174 |

* cited by examiner

TOUCH KNOB AND DEVICE USING SAME

FIELD

The subject matter herein generally relates to touch knobs and devices using the touch knobs.

BACKGROUND

On-board central control systems generally have control knobs. The knob is disposed on a cover of the on board central control system by boring or cutting a hole on the cover. However, the process of boring or cutting to form the hole is complicate and may cause to damage structure and strength of the cover.

Therefore, there is room for improvement in the art.

BRIEF DESCRIPTION OF THE DRAWINGS

Implementations of the present disclosure will now be described, by way of embodiments, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one". The term "circuit" is defined as an integrated circuit (IC) with a plurality of electric elements, such as capacitors, resistors, amplifiers, and the like.

Figure 1:
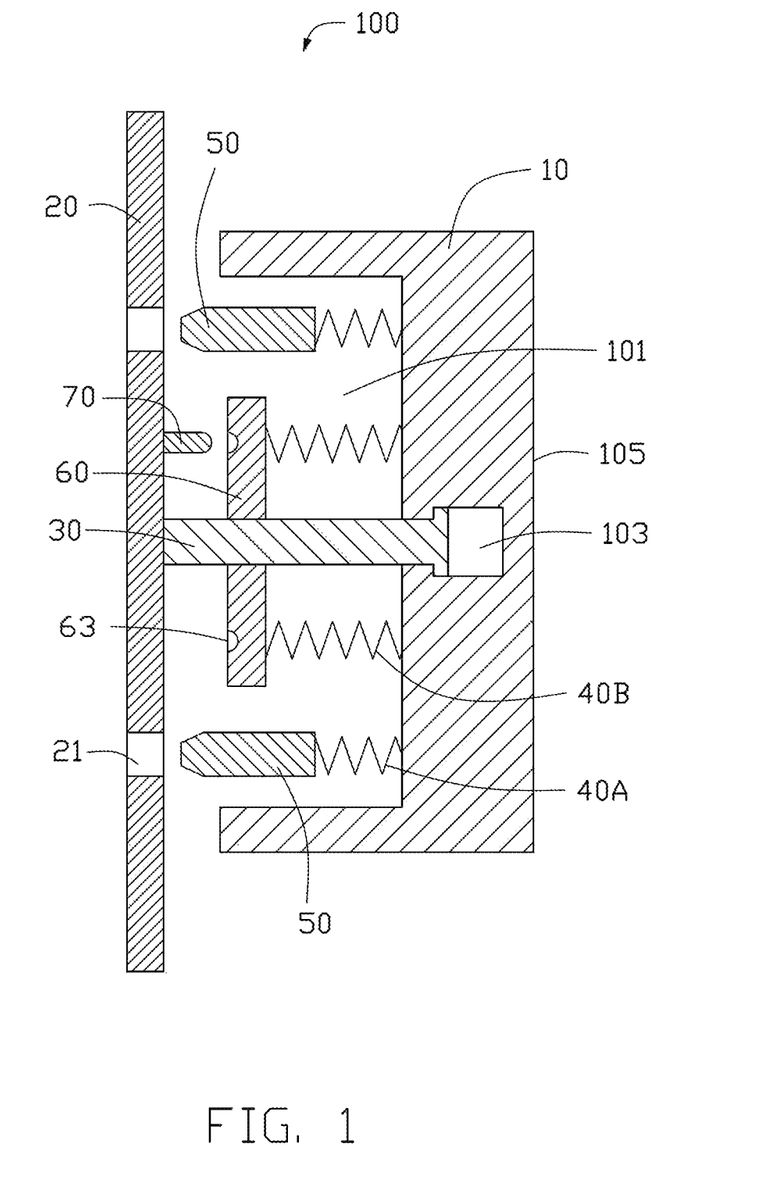
FIG. 1 is a cross-sectional view of a touch knob according to an embodiment.
Figure 2:
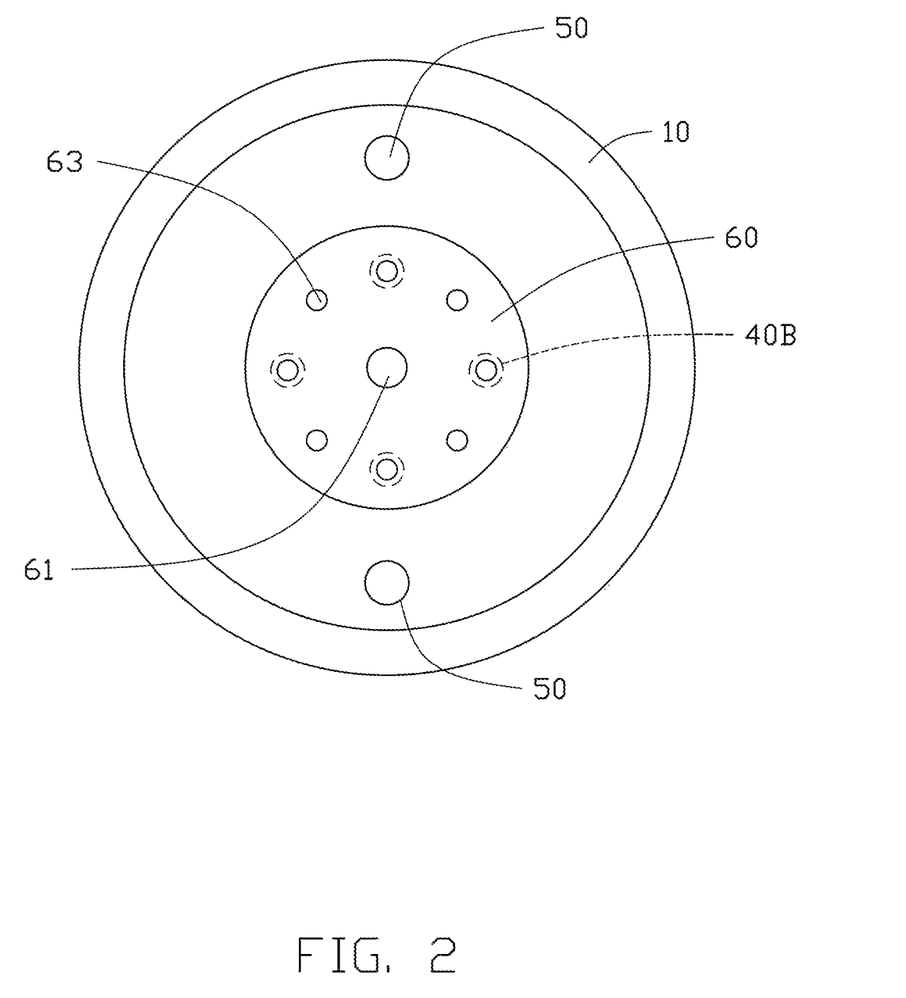
FIG. 2 is a planar view of a touch knob with base removed according to an embodiment.

FIGS. 1 and 2 show a touch knob 100 according to an embodiment of this disclosure. Referring to FIG. 1, the touch knob 100 includes a rotating cap 10, a base 20, a rotating shaft 30, and at least one conductive touch head 50. FIG. 2 is a planar view of the touch knob 100 of FIG. 1 removing the base 20.

As shown in FIGS. 1 and 2, in this embodiment, the rotating cap 10 is hollow and substantially cylindrical. The rotating cap 10 defines a receiving groove 101. Other components of the touch knob 100, such as the conductive touch heads 50, rotating plate 60, etc., are located in the receiving groove 101. The base 20 is located on a side of the rotating cap 10 (a side of an opening of the receiving groove 101), which substantially covers the receiving groove 101. The rotating cap 10 is movably located on the base 20. The rotating cap 10 may have other variations in shapes.

Figure 5:
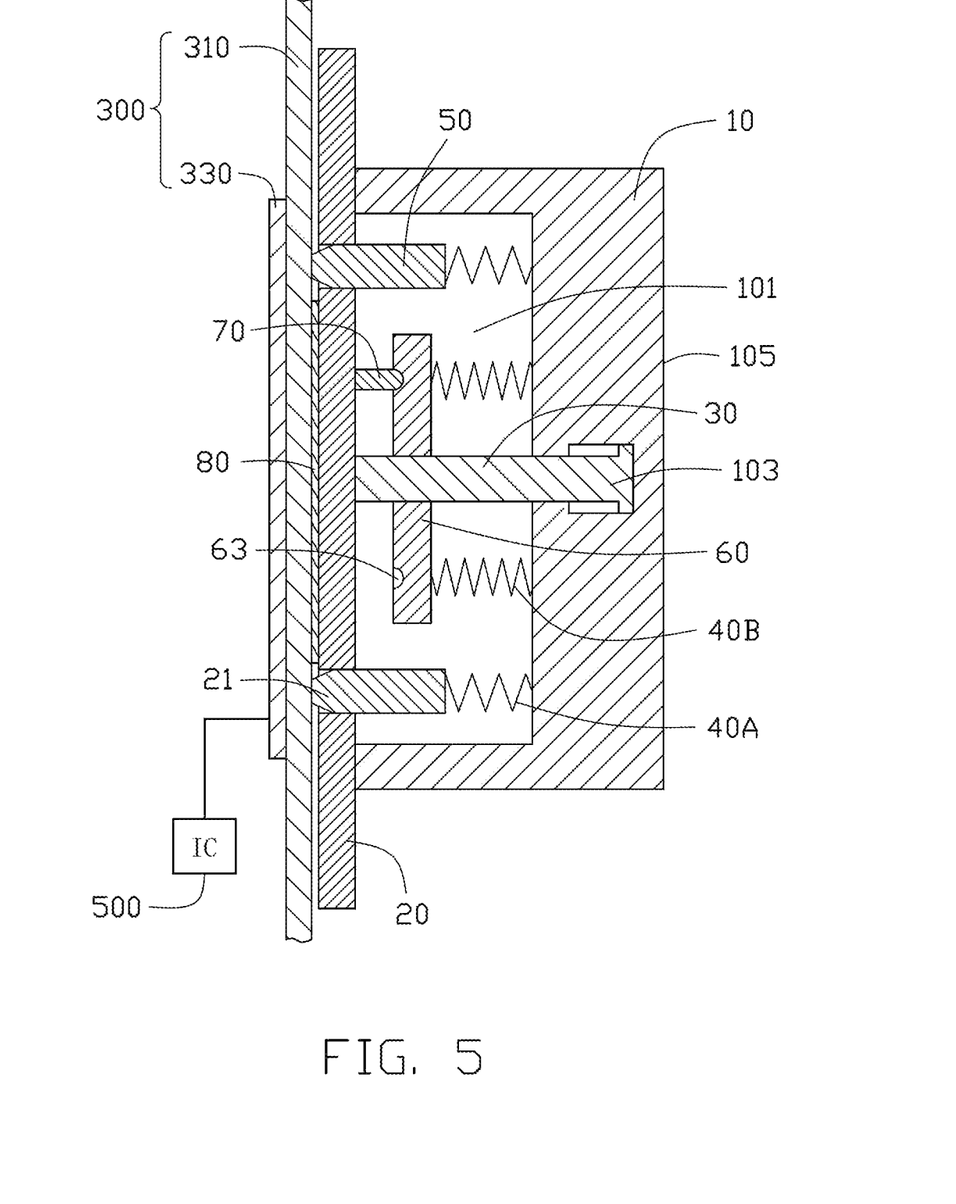
FIG. 5 is a cross-sectional view of the device using the touch knob in another state.

The rotating shaft 30 is fixed to the base 20 and extends into the receiving groove 101. The rotating cap 10 has a top surface away from the receiving groove 101 and the top surface is defined as a pressing surface 105. When there is no pressure on the surface 105 of the rotating cap 10, an end of the rotating shaft 30 away from the base 20 is not being pressed. Pressure on the rotating cap 10 moves the rotating cap 10 toward the base 20 until the rotating cap 10 is limited by abutting against the end of the rotating shaft 30 away from the base 20, as shown in FIG. 5.

Referring to FIG. 1, the rotating cap 10 further defines a fixing slot 103. The fixing slot 103 communicates with the receiving groove 101 and is located to correspond to the rotating shaft 30. The end of the rotating shaft 30 away from the base 20 is designed to engage with the fixing slot 103 so that the end of the rotating shaft 30 away from the base 20 can be unreleasably held in the fixing slot 103, and be capable of sliding in the fixing slot 103. Therefore, when the rotating cap 10 is pressed to move the rotating cap 10 toward the base 20 until the rotating cap 10 abuts against the end of the rotating shaft 30, the rotating cap 10 is rotatable.

Referring to FIG. 1 and FIG. 2, at least one conductive touch head 50 is located on the rotating cap 10 and located in the receiving groove 101. The conductive touch head 50 moves with the rotating cap 10. In this embodiment, the number of conductive touch heads 50 is two, which are spaced and symmetrically located on opposite sides of the rotating shaft 30. When the rotating cap 10 is pressed, the conductive touch head 50 can protrude from the receiving groove 101 to resist a touch panel 300 (as shown in FIG. 5). Therefore, the conductive touch head 50 changes a surface capacitance of the touch panel 300. The other one of the two conductive touch heads 50 achieves a pressing function.

Referring to FIG. 1, a spring 40A is located between each conductive touch head 50 and the rotating cap 10. The spring 40A has two opposite ends, one end of which is connected to the conductive touch head 50, and the other end is connected to the rotating cap 10. When the rotating cap 10 is pressed toward the base 20, the spring 40A is deformed. The spring 40A can increase its resistance to being pressed and a pressing feel of the conductive touch head 50. When pressure on the pressing cap 10 is removed, the spring 40A restores.

Referring to FIGS. 1 and 2, the touch knob 100 further includes a rotating plate 60 and a limiting post 70. The rotating plate 60 is located in the receiving groove 101 and is rotatable about the rotating shaft 30. The center of the rotating plate 60 defines a circular through hole 61 (shown in FIG. 2), and the rotating shaft 30 is inserted into the through hole 61 to rotate the rotating plate 60 about the rotating shaft 30. As shown in FIGS. 1 and 2, the rotating plate 60 further defines limiting holes 63. In this embodiment, there are eight limiting holes 63, and the eight limiting holes 63 are spaced apart from each other and circumferentially surround the through hole 61.

The rotating plate 60 is fixed to the rotating cap 10, and at least one spring 40B is located between the rotating plate 60 and the rotating cap 10. In this embodiment, a number of the springs 40B is four, and the four springs 40B are equally arranged. Each spring 40B is positioned opposite to a limiting hole 63. One end of spring 40B is connected to the rotating plate 60, and the other end is connected to the rotating cap 10. When the rotating cap 10 is pressed toward the base 20, the spring 40B is deformed, but restores when no longer pressed.

Referring to FIG. 1, the limiting posts 70 are fixed to the base 20 and protrude toward the receiving groove 101. The limiting posts 70 cooperate with the limiting holes 63, and each limiting post 70 can selectively extend into one limiting hole 63. As shown in FIG. 1, the limiting holes 63 are blind holes that do not penetrate the rotating plate 60. In other embodiments, the limiting holes 63 may penetrate the rotating plate 60.

Referring to FIG. 1, in this embodiment, the base 20 further defines at least one penetrating hole 21 corresponding to each conductive touch head 50, and the at least one penetrating hole 21 faces the conductive touch head 50. In this embodiment, the penetrating hole 21 extends to surround the rotating shaft 30, centered on a center of the rotating shaft 30. Thus, the conductive touch heads 50 always face the penetrating hole 21. When the rotating cap 10 is pressed toward the base 20, the conductive touch heads 50 move along the rotating cap 10 toward the base 20, and the conductive touch heads 50 protrude into the penetrating holes 21 and are exposed to the penetrating holes 21. In other embodiments, there is no penetrating hole 21 in the base 20, the base 20 is small and does not completely cover the receiving groove 101 nor does it cover the conductive touch heads 50.

Figure 3:
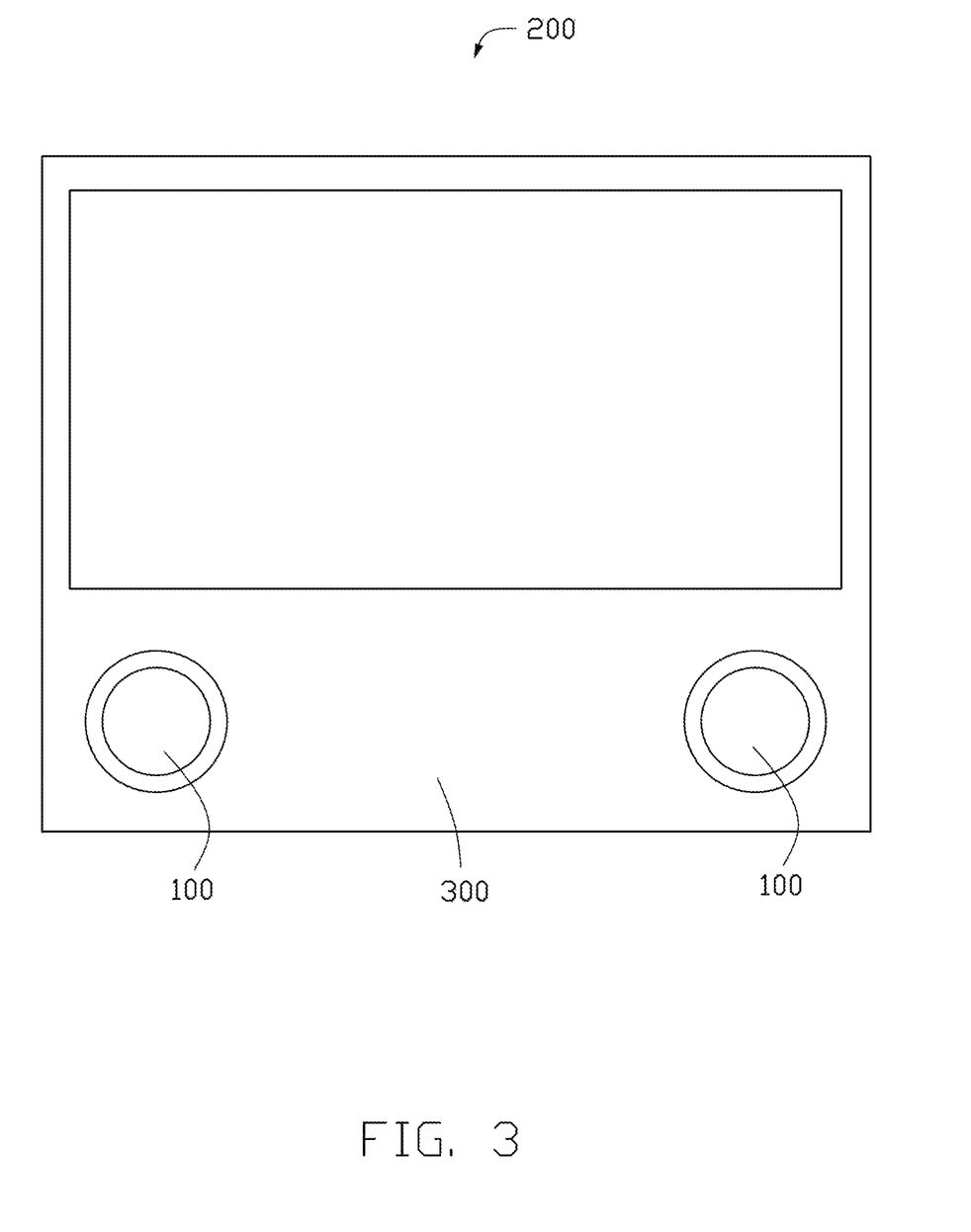
FIG. 3 is a planar view of a device using the touch knob.
Figure 4:
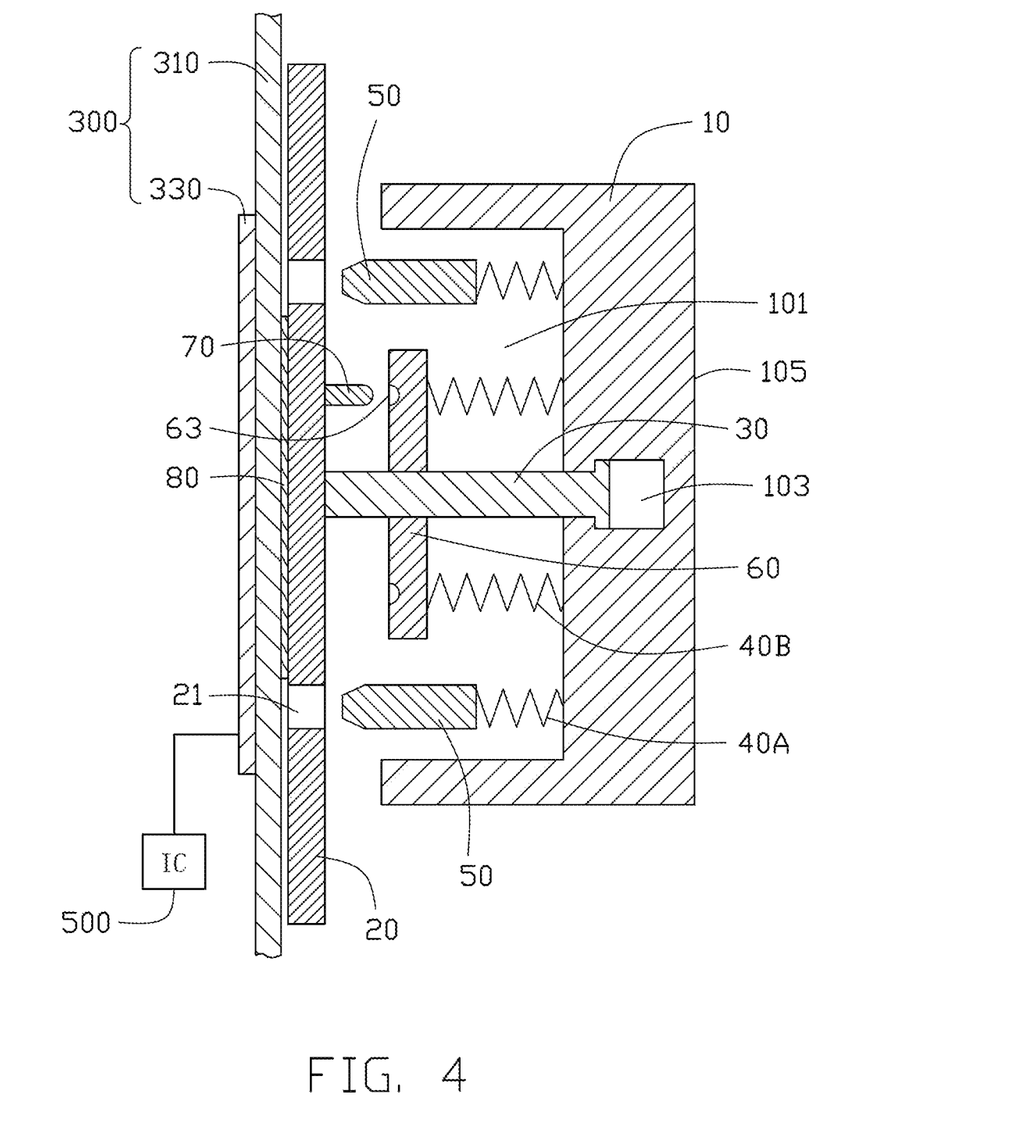
FIG. 4 is a cross-sectional view of a device using the touch knob.

FIG. 3 to FIG. 5 show a device 200 using the touch knob 100. In an embodiment, the device 200 is part of an in-vehicle central control system. As shown in FIG. 3, the device 200 includes a touch panel 300, and two touch knobs 100 are located on the touch panel 300. As shown in FIG. 4 and FIG. 5, the touch panel 300 includes a cover 310 and a touch sensing structure 330 located on a side (back side) of the cover 310, and the touch knobs 100 are located on a side (front side) of the cover 310 opposite to the touch sensing structure 330. The touch sensing structure 330 is electrically connected to a touch sensing circuit (IC) 500.

In this embodiment, as shown in FIG. 4 and FIG. 5, an adhesive material 80 is located between the cover 310 of the touch panel 300 and the base 20 of the touch knob 100, and the cover 310 is bonded to the base 20 by the adhesive material 80. In other embodiments, the adhesive material 80 may be omitted. For example, the base 20 may have adhesiveness or adsorption to be directly adsorbed on the cover 310. In one embodiment, the base 20 is a suction cup. Thus, the cover 310 does not need additional process to form mounting holes or mounting grooves (not shown) to install the touch knobs 100, and a binding area of the cover 310 and the touch knobs 100 does not need surface treatment.

The material of the cover 310 may be glass or plastic. In order to achieve optimal sensitivity between the conductive touch heads 50 and the touch panel 300, when the material of the cover 310 is glass, the thickness of the cover 310 is 0.2-6 mm, and when the material of the cover 310 is plastic, the thickness of the cover 310 is 0.5-3 mm.

As shown in FIG. 4, when the rotating cap 10 is not pressed, the conductive touch heads 50 do not contact the touch panel 300. As shown in FIG. 5, when the rotating cap 10 is pressed, the limiting post 70 extends into one limiting hole 63 of the rotating plate 60, and the conductive touch heads 50 abut against the cover 310 of the touch panel 300.

The material of the conductive touch heads 50 may be a conductive cloth or a conductive rubber, and an impedance value of the conductive touch heads 50 is 1 to 3 ohms. The rotating cap 10 is an electric conductor, and each of the conductive touch heads 50 and the rotating cap 10 are electrically connected. When a user directly rotates the rotating cap 10 by hand, since the hand is also an electric conductor, a surface capacitance of the touch panel 300 is changed through the rotating cap 10 and the conductive touch heads 50, and the touch sensing circuit 500 receives signals of the changed capacitance and performs some corresponding action.

Figure 6:
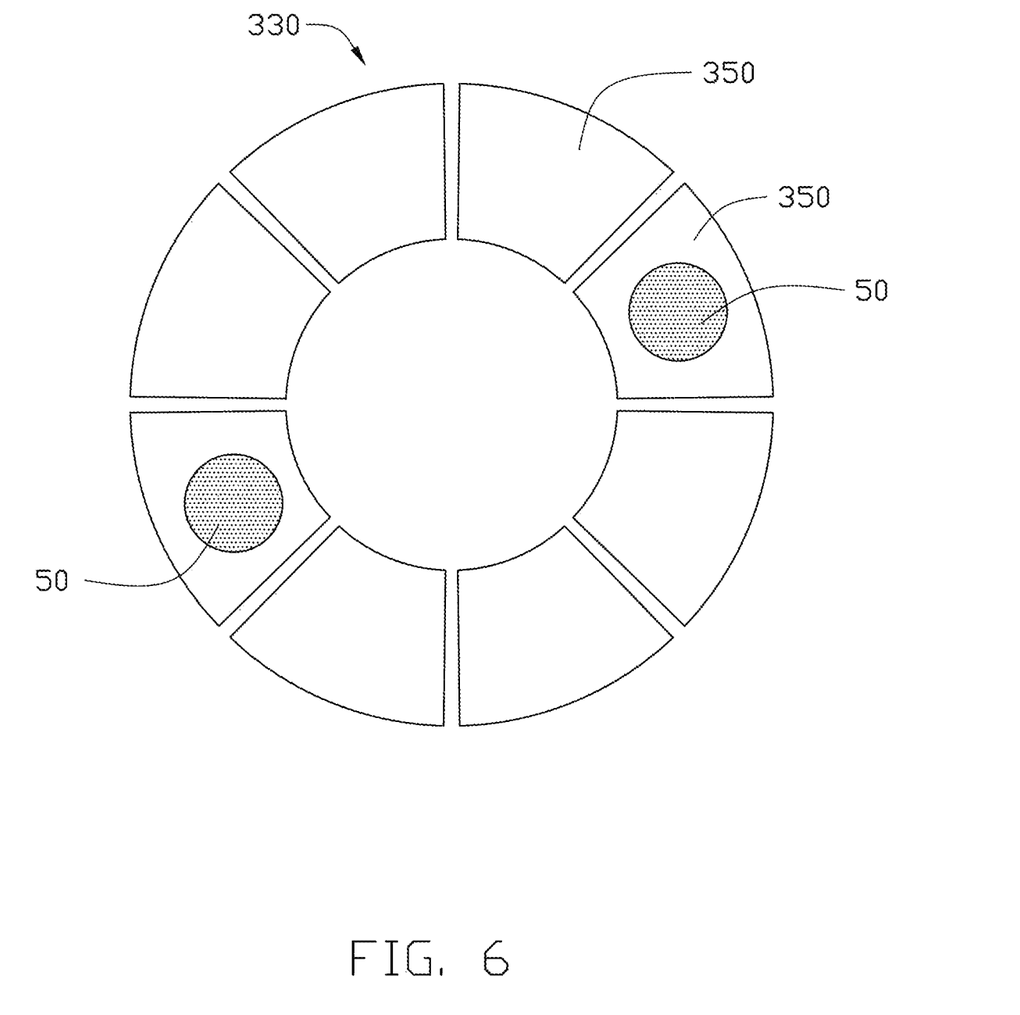
FIG. 6 is a planar distribution view of a touch sensing structure.

As shown in FIG. 6, the touch sensing structure 3000330 is arranged on a circumference around the center of the rotating shaft 30. In this embodiment, the touch sensing structure 330 is divided into eight sensing regions 350. Each of the eight limiting holes 63 of the rotating plate 60 correspond to one sensing region 350. When in use, by pressing and rotating the rotating cap 10, the conductive touch heads 50 and the rotating plate 60 are rotated by a certain angle, the limiting post 70 is aligned with and protrudes into one limiting hole 63 of the rotating plate 60, and the conductive touch heads 50 contact the cover 310 and correspond to a sensing region 350. Thus, a certain touch function is achieved. The conductive touch head 50 corresponds to a certain sensing region 350, and a certain touch function can be realized. The conductive touch head 50 rotates to correspond to different sensing regions 350, and different touch functions can be achieved. In other embodiments, the conductive touch head 50 can also be rotated to correspond to the two sensing regions 350 to achieve two specific touch functions.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. A touch knob, comprising:
   a base;
   a rotating shaft with an end fixed to the base;
   a rotating cap rotatably mounted to the rotating shaft, the rotating cap defining a receiving groove, and an opening of the receiving groove facing the base, and an end of the rotating shaft away from the base extending into the receiving groove and connected to the rotating cap, the rotating cap being configured to rotate about the rotating shaft and move away from and move close to the base within a predefined distance; and
   at least one conductive touch head located on the rotating cap and in the receiving groove, wherein the conductive touch head moves as the rotating cap moves;
   wherein the rotating cap defines a fixing slot within the receiving groove; and the rotating shaft engages with the fixing slot, and the end of the rotating shaft away from the base is locked in the fixing slot, so that the rotating shaft is not releasable and is configured to slide within the fixing slot when the rotating cap is pressed.

2. The touch knob of claim 1, wherein the rotating cap is an electric conductor, and the conductive touch head is electrically connected to the rotating cap.

3. The touch knob of claim 1, wherein a spring is located between each of the at least one conductive touch head and the rotating cap to achieve a connection there between.

4. The touch knob of claim 1, further comprising a rotating plate, the rotating plate is disposed on the rotating cap and located in the receiving groove and rotatable about the rotating shaft.

5. The touch knob of claim 4, further comprising a limiting post fixed to the base, the rotating plate defines a plurality of limiting holes spaced apart from each other, and the limiting post is configured to engage with the limiting holes, and when the rotating plate rotates, the limiting post extends into one of the limiting holes.

6. The touch knob of claim 5, wherein at least one spring is located between the rotating plate and the rotating cap to achieve a connection there between.

7. The touch knob of claim 1, wherein the base defines at least one penetrating hole corresponding to the at least one conductive touch head, and the at least one penetrating hole faces the conductive touch head.

8. A device, comprising:
a touch knob comprising:
a base;
a rotating shaft with an end fixed to the base;
a rotating cap rotatably mounted to the rotating shaft, the rotating cap defining a receiving groove, and an opening of the receiving groove facing the base, and an end of the rotating shaft away from the base extending into the receiving groove and connected to the rotating cap, the rotating cap being configured to rotate about the rotating shaft and move away from and move close to the base within a predefined distance; and
at least one conductive touch head located on the rotating cap and in the receiving groove, wherein the conductive touch head moves as the rotating cap moves; and
a touch panel comprising:
a cover; and
a touch sensing structure located on a side of the cover;
wherein the touch knob is located on a side of the cover opposite to the touch sensing structure, the base is fixed to the cover, and when the rotating cap is pressed and rotated to force the conductive touch head to extend out of the receiving groove to resist the touch panel, a surface capacitance of the touch panel is changed to implement a touch function.

9. The device of claim 8, wherein an adhesive material is located between the base and the cover to fix the touch knob on the cover.

10. The device of claim 8, wherein the base is adhesive or absorbent so as to be directly fixed to the cover.

11. The device of claim 8, wherein the rotating cap is an electric conductor, and the conductive touch head is electrically connected to the rotating cap.

12. The device of claim 8, wherein the rotating cap defines a fixing slot within the receiving groove; and the rotating shaft engages with the fixing slot, and the end of the rotating shaft away from the base is locked in the fixing slot, so that the rotating shaft is not releasable and is configured to slide within the fixing slot when the rotating cap is pressed.

13. The device of claim 8, wherein a spring is located between each of the at least one conductive touch head and the rotating cap to achieve a connection there between.

14. The device of claim 8, further comprising a rotating plate, the rotating plate is disposed on the rotating cap and located in the receiving groove and rotatable about the rotating shaft.

15. The device of claim 14, further comprising a limiting post fixed to the base, the rotating plate defines a plurality of limiting holes spaced apart from each other, and the limiting post is configured to engage with the limiting holes, and when the rotating plate rotates, the limiting post extends into one of the limiting holes.

16. The device of claim 15, wherein at least one spring is located between the rotating plate and the rotating cap to achieve a connection there between.

17. The device of claim 8, wherein the base defines at least one penetrating hole corresponding to the at least one conductive touch head, and the at least one penetrating hole faces the conductive touch head.

* * * * *